US012715806B2

(12) United States Patent
Lee et al.

(10) Patent No.: US 12,715,806 B2
(45) Date of Patent: Aug. 25, 2026

(54) CASSETTE FOR LOADING GLASS AND GLASS TREATMENT METHOD

(71) Applicant: Samsung Display Co., LTD., Yongin-si (KR)

(72) Inventors: Changmin Lee, Yongin-si (KR); Yong-Kyun Sim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 207 days.

(21) Appl. No.: 18/211,471

(22) Filed: Jun. 19, 2023

(65) Prior Publication Data

US 2024/0076225 A1 Mar. 7, 2024

(30) Foreign Application Priority Data

Sep. 2, 2022 (KR) ........................ 10-2022-0111281

(51) Int. Cl.
*C03B 32/00* (2006.01)
*B65D 85/48* (2006.01)

(52) U.S. Cl.
CPC .......... *C03B 32/00* (2013.01); *C03B 2225/02* (2013.01)

(58) Field of Classification Search
None
See application file for complete search history.

(56) References Cited

U.S. PATENT DOCUMENTS 2,919,022 A * 12/1959 Lidgard ................. B65D 85/48 206/448
5,704,493 A * 1/1998 Fujikawa .......... H01L 21/67313 118/500
6,776,289 B1 * 8/2004 Nyseth .............. H01L 21/67383 206/711
2020/0270073 A1 * 8/2020 Wendel ................ B65D 25/103

FOREIGN PATENT DOCUMENTS

CN 104936926 A * 9/2015 ........... C03C 21/002
CN 213386693 U * 6/2021 ............. B65D 85/48
CN 213801141 U * 7/2021 ............. B65G 49/06
JP 2011235963 A * 11/2011 ............. B65D 81/05
JP 2012157971 A * 8/2012 ............. B24B 29/02
JP 2013118287 A * 6/2013 ............. H01L 21/68
JP 2013155057 A * 8/2013

(Continued)

OTHER PUBLICATIONS

Machine translation JP2011235963 (Year: 2011).*
Machine translation JP 2013155057 (Year: 2013).*

*Primary Examiner* — Jodi C Franklin
(74) *Attorney, Agent, or Firm* — CANTOR COLBURN LLP

(57) ABSTRACT

A cassette for loading glass includes a first frame extending in a first direction, a second frame spaced apart from the first frame in a second direction intersecting the first direction, a first support coupled to the first frame, and a second support coupled to the second frame. A plurality of first grooves are defined in the first support, the plurality of first grooves are spaced apart from each other in the first direction, each of the plurality of first grooves extends in a third direction inter- (Continued)

secting the first direction and the second direction, and the first support includes a first protrusion protruding from an inner surface of each of the plurality of first grooves.

18 Claims, 7 Drawing Sheets

(56) References Cited

FOREIGN PATENT DOCUMENTS

| | | | | | |
|---|---|---|---|---|---|
| JP | 2019029612 | A | * | 2/2019 | ............. B24D 13/10 |
| JP | 2021031371 | A | * | 3/2021 | ............. B08B 11/04 |
| KR | 20040046872 | A | * | 6/2004 | ............... G02F 1/13 |
| KR | 20080056907 | A | * | 6/2008 | ........... B65G 49/066 |
| KR | 2011106753 | A | * | 9/2011 | ............. H01L 21/68 |
| KR | 20070084978 | A | * | 1/2013 | ............. H01L 21/68 |
| KR | 20130089354 | A | * | 8/2013 | ............. C03C 15/00 |
| KR | 10-1300524 | B1 | | 9/2013 | |
| KR | 101302191 | B1 | * | 9/2013 | ............. B65D 85/48 |
| KR | 101353971 | B1 | * | 2/2014 | ........... C03C 21/002 |
| KR | 101373306 | B1 | * | 3/2014 | ......... H01L 21/6708 |
| KR | 20140034561 | A | * | 3/2014 | ......... H01L 21/6715 |
| KR | 20150072540 | A | * | 6/2015 | ......... H01L 21/6773 |
| KR | 20150104856 | A | * | 9/2015 | ............. B65D 85/48 |
| KR | 20150116961 | A | * | 10/2015 | ........... B65G 49/062 |
| KR | 200487579 | Y1 | * | 6/2017 | ......... H01L 21/6734 |
| KR | 10-2282666 | B1 | | 7/2021 | |
| KR | 10-2315637 | B1 | | 10/2021 | |
| KR | 20210143356 | A | * | 11/2021 | ............. B08B 11/04 |
| WO | WO-2004103862 | A2 | * | 12/2004 | ............. A63B 67/14 |
| WO | WO-2012004936 | A1 | * | 1/2012 | ............... B65G 1/04 |

* cited by examiner

CASSETTE FOR LOADING GLASS AND GLASS TREATMENT METHOD

This application claims priority to Korean Patent Application No. 10-2022-0111281, filed on Sep. 2, 2022, and all the benefits accruing therefrom under 35 U.S.C. § 119, the content of which in its entirety is herein incorporated by reference.

BACKGROUND

Embodiments of the present disclosure described herein relate to a cassette for loading glass and a glass treatment method.

Various display devices used in multimedia devices such as televisions, mobile phones, navigation devices, computer monitors, and game consoles have been developed. The display devices may include glass.

The glass may be subjected to a strengthening process to improve surface hardness, impact resistance, processability, and the like. The strengthening process may include physical strengthening and chemical strengthening. A cassette for loading the glass may be provided to facilitate storage and transportation during the strengthening process.

SUMMARY

Embodiments of the present disclosure provide a cassette for loading glass having improved reliability, and a glass treatment method using the same.

A cassette for loading glass according to an embodiment of the present disclosure includes a first frame extending in a first direction, a second frame spaced apart from the first frame in a second direction intersecting the first direction; a first support coupled to the first frame, and a second support coupled to the second frame, wherein a plurality of first grooves are defined in the first support, the plurality of first grooves are spaced apart from each other in the first direction, each of the plurality of first grooves each extends in a third direction intersecting the first direction and the second direction, and the first support includes a first protrusion protruding from an inner surface of each of the plurality of first grooves.

The first protrusion may include a fluoride resin.

The first protrusion may be provided as a plurality, and the plurality of first protrusions are arranged to be adjacent to each other.

The first protrusion may have a quadrangular tube shape.

The first protrusion may have a hemispherical shape.

The first protrusion may have a triangular pyramid shape.

The first protrusion may be provided as a plurality, and the plurality of first protrusions are arranged in the third direction intersecting the first direction and the second direction.

A plurality of second grooves facing the plurality of first grooves in the second direction may be defined in the second support.

Each of the plurality of second grooves extends in the third direction.

The second support may include a second protrusion protruding from an inner surface of each of the plurality of second grooves.

The second protrusion may have a quadrangular tube shape.

A glass treatment method according to an embodiment of the present disclosure includes strengthening glass, transshipping the glass into a cassette, and inspecting the glass, wherein the cassette includes a first frame extending in a first direction, a second frame spaced apart from the first frame in a second direction intersecting the first direction, a first support coupled to the first frame, and a second support coupled to the second frame, wherein a plurality of first grooves are defined in the first support, the plurality of first grooves are spaced apart from each other in the first direction, each of the plurality of first grooves extends in a third direction intersecting the first direction and the second direction, and the first support includes a first protrusion protruding from an inner surface of each of the plurality of first grooves, and the transshipping of the glass into the cassette includes arranging the glass in each of the plurality of first grooves.

The arranging of the glass in each of the plurality of first grooves may include inputting and loading the glass in each of the plurality of first grooves in the third direction.

The inputting and loading of the glass in each of the plurality of first grooves in the third direction may include spacing the glass from the inner surface of each of the plurality of first grooves.

The first protrusion may have a quadrangular tube shape, and the inputting and loading of the glass in each of the plurality of first grooves in the third direction may further include allowing the glass to come into contact with the first protrusion.

The first protrusion may have a hemispherical shape, and the inputting and loading of the glass in each of the plurality of first grooves in the third direction may further includes allowing the glass to come into contact with the first protrusion.

The first protrusion may have a triangular pyramid shape, and the inputting and loading of the glass in each of the plurality of first grooves in the third direction may further include allowing the glass to come into contact with the first protrusion.

The inspecting of the glass may include cleaning the glass.

The first protrusion may include a fluoride resin.

A plurality of second grooves facing the plurality of first grooves in the second direction may be defined in the second support, and the arranging of the glass in each of the plurality of first grooves may include arranging the glass between the plurality of first grooves and the plurality of second grooves.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
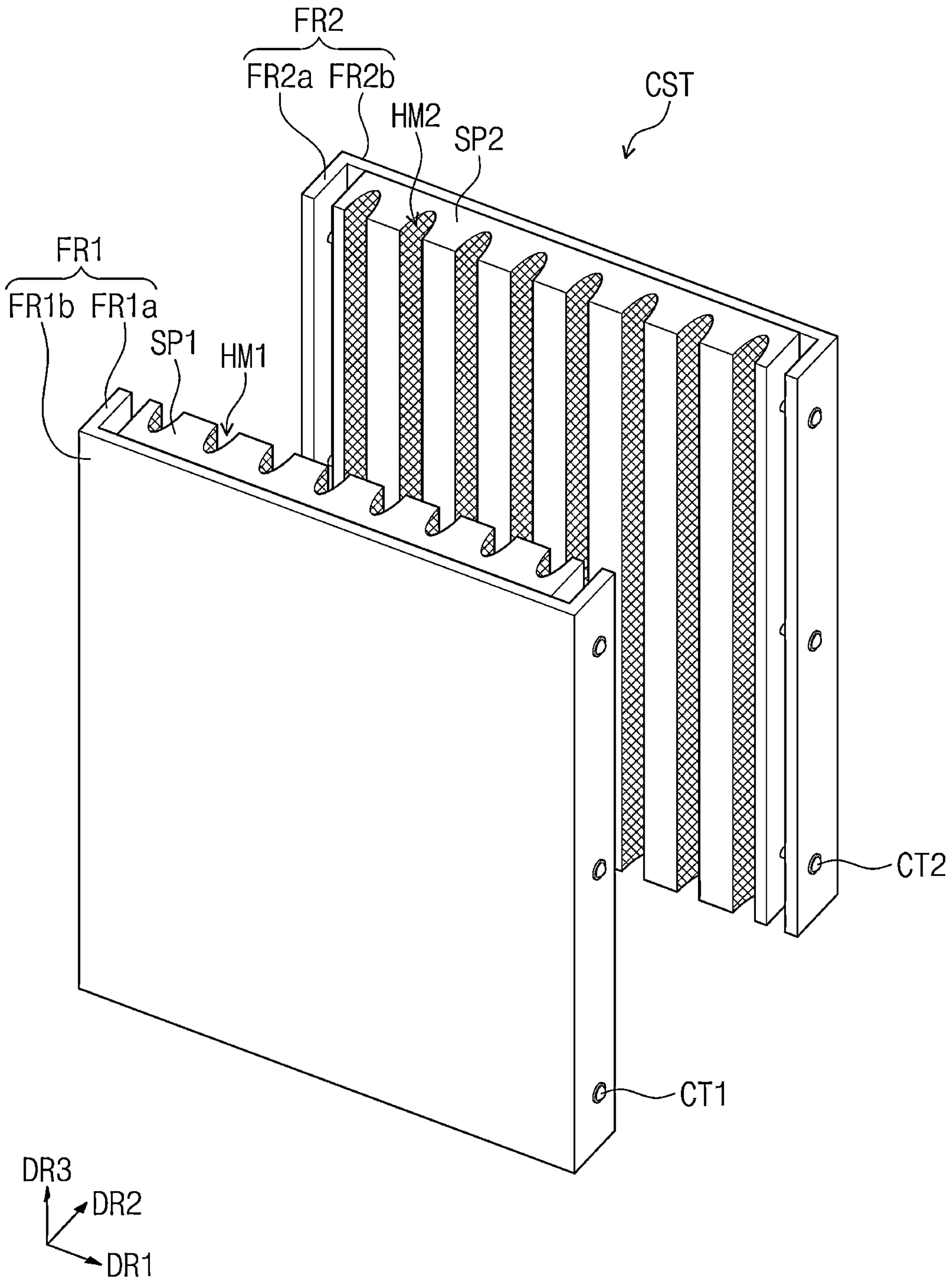
FIG. 1 is a perspective view of a cassette for loading glass according to an embodiment of the present disclosure.

In the present specification, the expression that a first component (or area, layer, part, portion, etc.) is "on", "connected with", or "coupled to" a second component means that the first component is directly on, connected with, or coupled to the second component or means that a third component is interposed therebetween.

The same reference numerals refer to the same components. Further, in the drawings, the thickness, the ratio, and the dimension of components are exaggerated for effective description of technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The expression "and/or" includes one or more combinations which associated components are capable of defining.

Although the terms "first", "second", etc. may be used to describe various components, the components should not be limited by the terms. The terms are only used to distinguish one component from another component. For example, without departing from the right scope of the present disclosure, a first component may be referred to as a second component, and similarly, the second component may be also referred to as the first component. Singular expressions include plural expressions unless clearly otherwise indicated in the context.

Also, the terms "under", "below", "on", "above", etc. are used to describe the correlation of components illustrated in drawings. The terms that are relative in concept are described based on a direction illustrated in drawings.

It will be understood that the terms "include", "comprise", "have", etc. specify the presence of features, numbers, steps, operations, elements, or components, described in the specification, or a combination thereof, and do not exclude in advance the presence or additional possibility of one or more other features, numbers, steps, operations, elements, or components or a combination thereof.

Unless otherwise defined, all terms (including technical terms and scientific terms) used in the present specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in overly ideal or overly formal meanings unless explicitly defined herein.

Hereinafter, embodiments of the present disclosure will be described with reference to accompanying drawings.

FIG. 1 is a perspective view of a cassette for loading glass according to an embodiment of the present disclosure.

Referring to FIG. 1, a display device may include a cover glass including an ultra-thin glass ("UTG") for protecting a display panel. A cassette CST for loading glass may simultaneously load a plurality of UTGs in a process of manufacturing the UTG.

The cassette CST for loading glass may include a first frame FR1, a second frame FR2, a first support SP1, and a second support SP2.

The first frame FR1 may extend in a first direction DR1. The first frame FR1 may include first protrusions FR1*a* protruding in a second direction DR2 and a first planar part FR1*b* including a plane defined by a third direction DR3 and the first direction DR1, and the first planar part FR1*b* and the first protrusions FRla may surround the first support SP1. Here, the second direction DR2 intersects the first direction DR1, and the third direction DR3 intersects the first direction DR1 and the second direction DR2.

The second frame FR2 may include second protrusions FR2*a* protruding in a direction opposite to the second direction DR2 and a second planar part FR2*b* including a plane defined by the first direction DR1 and the third direction DR3, and the second planar part FR2*b* and the second protrusions FR2*a* may surround the second support SP2. The second frame FR2 may be spaced apart from the first frame FR1 in the second direction DR2. The first frame FR1 and the second frame FR2 may face each other.

The first support SP1 may be coupled to the first frame FR1 by a first fixing portion CT1. The first fixing portion CT1 may be provided as a plurality. Three first fixing portions CT1 are illustrated in FIG. 1 as an example, but the number of the first fixing portions CT1 according to the embodiment of the present disclosure is not limited as long as the first support SP1 is fixed to the first frame FR1.

The second support SP2 may be coupled to the second frame FR2 by a second fixing portion CT2. The second fixing portion CT2 may be provided as a plurality. Three second fixing portions CT2 are illustrated in FIG. 1 as an example, but the number of the second fixing portions CT2 according to the embodiment of the present disclosure is not limited as long as the second support SP2 is fixed to the second frame FR2.

A plurality of first grooves HM1 may be defined in the first support SP1. The plurality of first grooves HM1 may be spaced apart from each other in the first direction DR1. The plurality of first grooves HM1 may each extend in the third direction DR3. Eight first grooves HM1 defined in the first support SP1 are illustrated in FIG. 1 as an example, but the number of the plurality of first grooves HM1 according to the embodiment of the present disclosure is not limited thereto.

A plurality of second grooves HM2 may be defined in the second support SP2. The plurality of second grooves HM2 may be spaced apart from each other in the first direction DR1. The plurality of second grooves HM2 may each extend in the third direction DR3. The plurality of second grooves HM2 may be defined to correspond to the plurality of first grooves HM1 in the second direction DR2.

Figure 2:
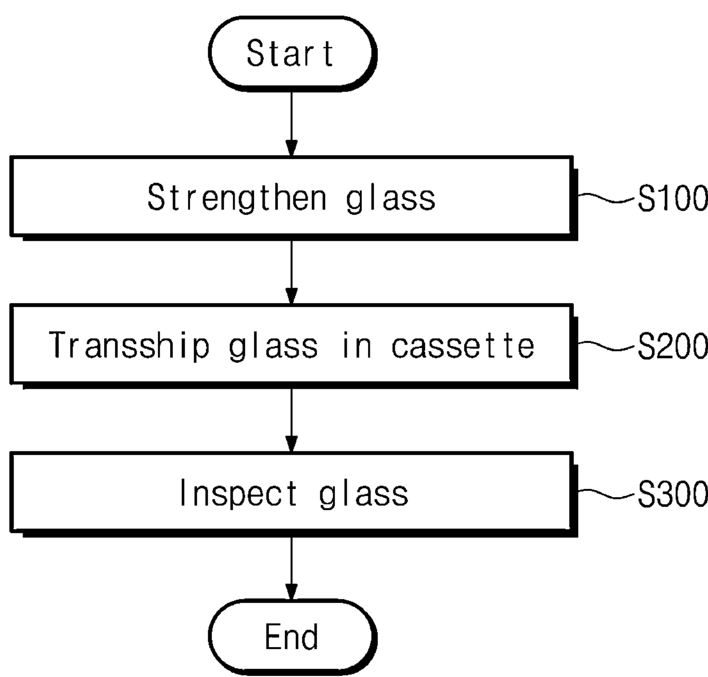
FIG. 2 is a flowchart illustrating a glass treatment method according to the embodiment of the present disclosure.
Figure 3:
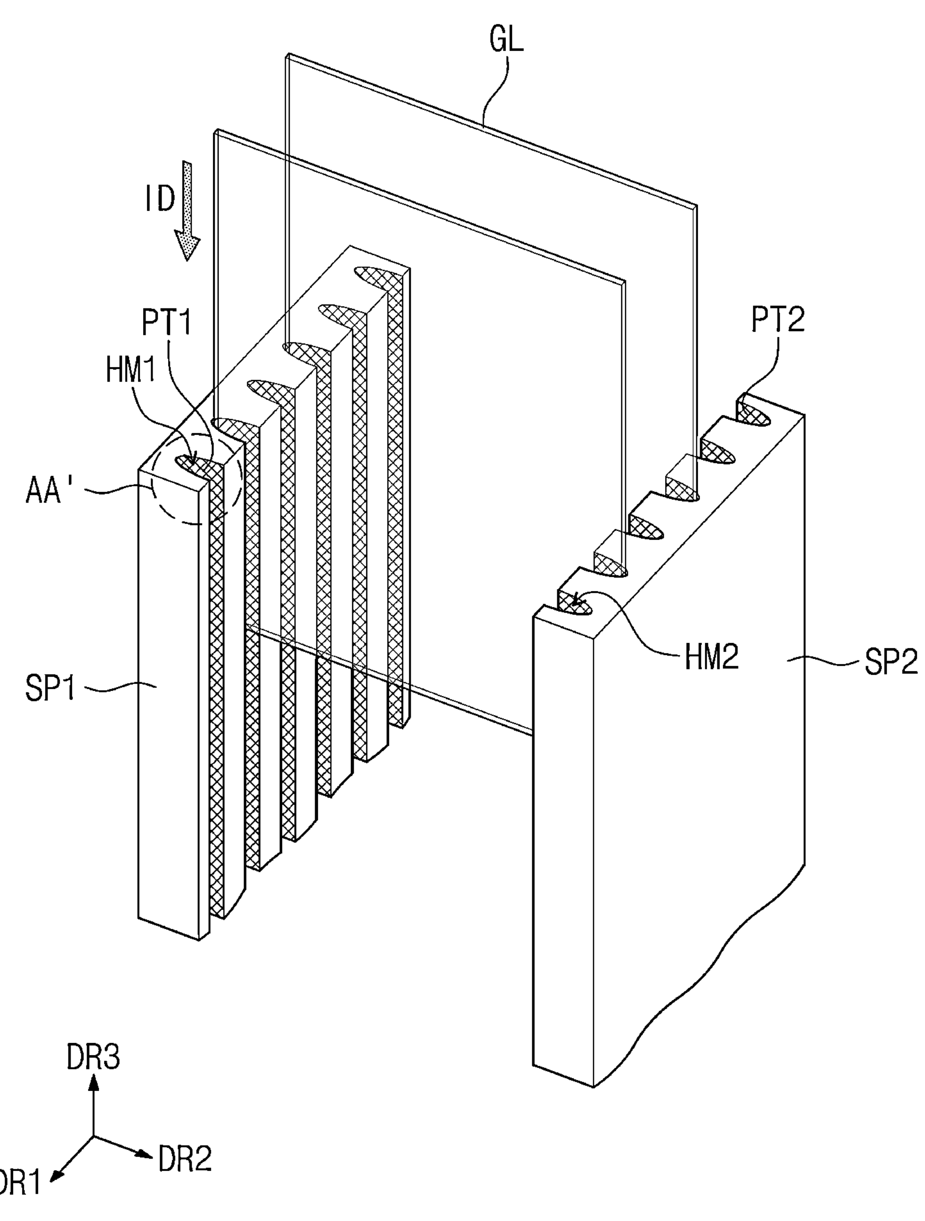
FIG. 3 is a perspective view illustrating a state in which the glass is transshipped into the cassette according to the embodiment of the present disclosure.

FIG. 2 is a flowchart illustrating a glass treatment method according to the embodiment of the present disclosure, and FIG. 3 is a perspective view illustrating a state in which the glass is transshipped in the cassette according to the embodiment of the present disclosure.

Referring to FIGS. 1 to 3, glass GL may be strengthened to be used as the cover glass of the display device (S100). Operation S100 of strengthening the glass GL may include an operation of preheating the glass GL, an operation of chemically strengthening the glass GL, an operation of cooling the glass GL, and an operation of cleaning the glass GL.

The operation of preheating the glass GL may be a process of preheating and heating the glass GL to a predetermined temperature to chemically strengthen the glass GL. In the operation of preheating the glass GL, a temperature-increasing process and a constant temperature process are repeatedly performed, and thus the glass GL may be prevented from being damaged due to thermal expansion caused by sudden heating. In the preheating operation, reactivity of the glass GL in the chemical strengthening treatment operation may be improved.

In the operation of chemically strengthening the glass GL, the glass GL may be put into a strengthening furnace. A molten liquid for the chemical strengthening treatment may be accommodated in the strengthening furnace. The glass GL may be chemically strengthened by an ion substitution reaction with the molten liquid. For example, the molten liquid may include a potassium nitrate solution.

The glass GL is preheated by the preheating operation, so that the ion substitution reaction between sodium ions on the surface of the glass GL and the potassium nitrate solution that is the molten liquid may be easily performed.

The ion substitution reaction may be performed on the glass GL provided to the high-temperature molten liquid. For example, the high temperature may be 400 degrees in Celsius (° C.) to 500° C. In the chemical strengthening treatment operation, the small particles on the surface of the glass GL may be ion-exchanged with large particles of the molten liquid. For example, the small particles may be the sodium ions, and the large particles may be potassium ions. The molten liquid may include a liquefied potassium nitrate ($KNO_3$) solution. The sodium ions ($Na+$) distributed on a surface of the glass GL and having a small ionic radius may be substituted with potassium ions ($K+$) having a large ionic radius in the potassium nitrate solution. A compressive stress layer is formed on the surface of the glass GL by the ion substitution reaction, so that the surface density may be improved.

In the operation of cooling the glass GL, the glass GL may be slowly cooled. In the operation of cooling the glass GL, deformation of the ion-substituted glass GL may be prevented, and a residual stress may be removed.

In the operation of slowing cooling the glass GL, an impact, which may be generated while a portion of the surface of the ion-substituted high-temperature unstable glass GL is coupled to a potassium nitrate of the molten liquid, may be prevented. Further, an impact that may be generated inside the glass GL due to a difference in a partial cooling rate of the glass GL, may be prevented in the case of rapid cooling, and generation of internal cracks may be prevented.

In the operation of cleaning the glass GL, the glass GL may be bubble-washed using air bubbles. In the cleaning operation, the glass GL is cleaned and cooled at the same time, the residual stress of the glass GL formed in the chemical strengthening treatment operation is removed, and thus the glass GL may be stabilized. The operation of cleaning the glass GL according to an embodiment of the present disclosure may be performed after the glass GL is transshipped in the cassette CST for loading glass.

Next, the chemically strengthened glass GL may be transshipped in the cassette CST for loading glass (S200). The glass GL may be transshipped into the cassette CST for loading glass so that the glass GL is not damaged by the effects of changes such as impacts, contamination, scratches, and dust while being moved.

When the glass GL is loaded on the cassette CST for loading glass, the glass GL may be arranged in each of the plurality of first grooves HM1. The glass GL arranged in one first groove HM1 may be arranged inside the second groove HM2 facing the one first groove HM1.

In this case, the glass GL may be input and loaded into each of the plurality of first grooves HM1 in an input direction ID. The input direction ID may be parallel to the third direction DR3. That is, the input direction ID may be parallel to a direction in which the plurality of first grooves HM1 and the plurality of second grooves HM2 extend.

The glass GL may be arranged between the plurality of first grooves HM1 and the plurality of second grooves HM2 facing the plurality of first groove HM1, respectively. The glass GL may be input by being guided by each of the plurality of first grooves HM1 extending in the third direction DR3. The glass GL may be input by being guided by each of the plurality of second grooves HM2 extending in the third direction DR3. That is, one glass GL may be input by being guided by one first groove HM1 and one second groove HM2 facing the one first groove HM1.

The glass GL transshipped into the cassette CST for loading glass is moved to an inspection process, and a strengthening state of the glass GL may be inspected (S300). Thereafter, a protective film may be attached to the glass GL. The glass GL may be an ultra-thin glass. The glass GL may be strengthened through a chemical treatment process, and the strengthened glass GL may be applied to the cover glass for the display device.

Figure 4:
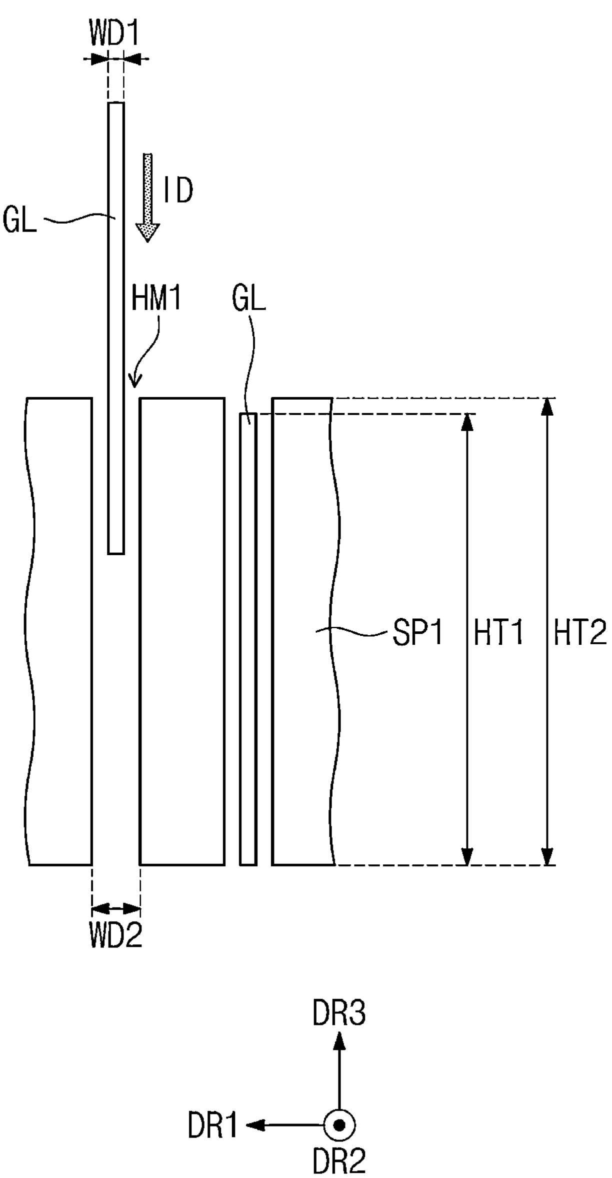
FIG. 4 is a cross-sectional view illustrating a process of putting the glass into the cassette according to the embodiment of the present disclosure.

FIG. 4 is a cross-sectional view illustrating a process of putting the glass into the cassette according to the embodiment of the present disclosure.

Referring to FIG. 4, the glass GL used for the cover glass of the display device (for example, a foldable display device) should be foldable. The glass GL may have a width WD1 in the first direction DR1. The width WD1 of the glass GL may be 100 micrometers (pin) or less. For example, the width WD1 of the glass GL may be 30 μm. Since the width WD1 of the glass GL is smaller than 0.5 millimeters (mm) (i.e., 500 μm) that is a thickness of the existing rigid cover glass, when the glass GL is folded, a stress generated in the folded area is reduced, so that the glass GL may be flexibly folded.

The first groove HM1 may have a width WD2 in the first direction DR1. The width WD2 of the first groove HM1 may be greater than the width WD1 of the glass GL. Accordingly, the glass GL may be easily input to the first groove HM1.

The glass GL may be input in the input direction ID by being guided by the first groove HM1. The glass GL may have a height HT1 in the third direction DR3. The first groove HM1 may be formed to extend in the third direction DR3. The first groove HM1 may have a height HT2 in the third direction DR3. The height HT2 of the first groove HM1 may be substantially the same as a height of the first support SP1. The height HT2 of the first groove HM1 may be greater than the height HT1 of the glass GL.

Unlike the present disclosure, when the height of the member for guiding the glass GL is smaller than the height HT1 of the glass GL and thus the member is provided in plurality instead of an integral part, the glass GL is easily bent due to a ultra-thin film thickness in a space in which the glass GL between the members cannot be guided, and thus the glass GL cannot be accurately input to the member. Accordingly, a process time may be increased in a process of re-extracting the glass GL in a direction opposite to the input direction ID and then re-input the glass GL. For example, a transshipment time obtained by considering the re-input process may be taken 90 seconds. However, according to the present disclosure, when one end of the glass GL is input through the first groove HM1, the first groove HM1 may guide the glass GL until the other end of the glass GL is input. That is, the glass GL may be easily input along the integrally formed first groove HM1 in the input direction ID. The process time taken for the transshipment of the glass GL may be reduced. When the cassette CST (see FIG. 1) for loading glass is used, the transshipment time may take 48 seconds. The cassette CST (see FIG. 1) for loading glass may reduce a time consumed for the transshipment. Thus, the cassette CST (see FIG. 1) for loading glass having improved reliability may be provided.

Further, unlike the present disclosure, when the height of the member for guiding the glass GL is smaller than the height HT1 of the glass GL and thus the member is provided in plurality instead of an integral part, defects such as cracks, scratches, stains, and chipping in which an end portion is broken may occur because the member and the glass GL collide with each other during the transshipment due to a bending phenomenon of the glass GL. Further, since the glass GL is easily bent, a gap between the glass GL and another adjacent glass GL may be narrowed. Accordingly, defects such as cracks, scratches, stains, and chipping due to collision between the glasses GL may occur. However, according to the present disclosure, when one end of the glass GL is input through the first groove HM1, the first groove HM1 may guide the glass GL until the other end of the glass GL is input. That is, the glass GL may be easily input along the integrally formed first groove HM1 in the input direction ID. Thus, the cassette CST (see FIG. 1) for loading glass having improved reliability of the glass GL may be provided.

Figure 5:
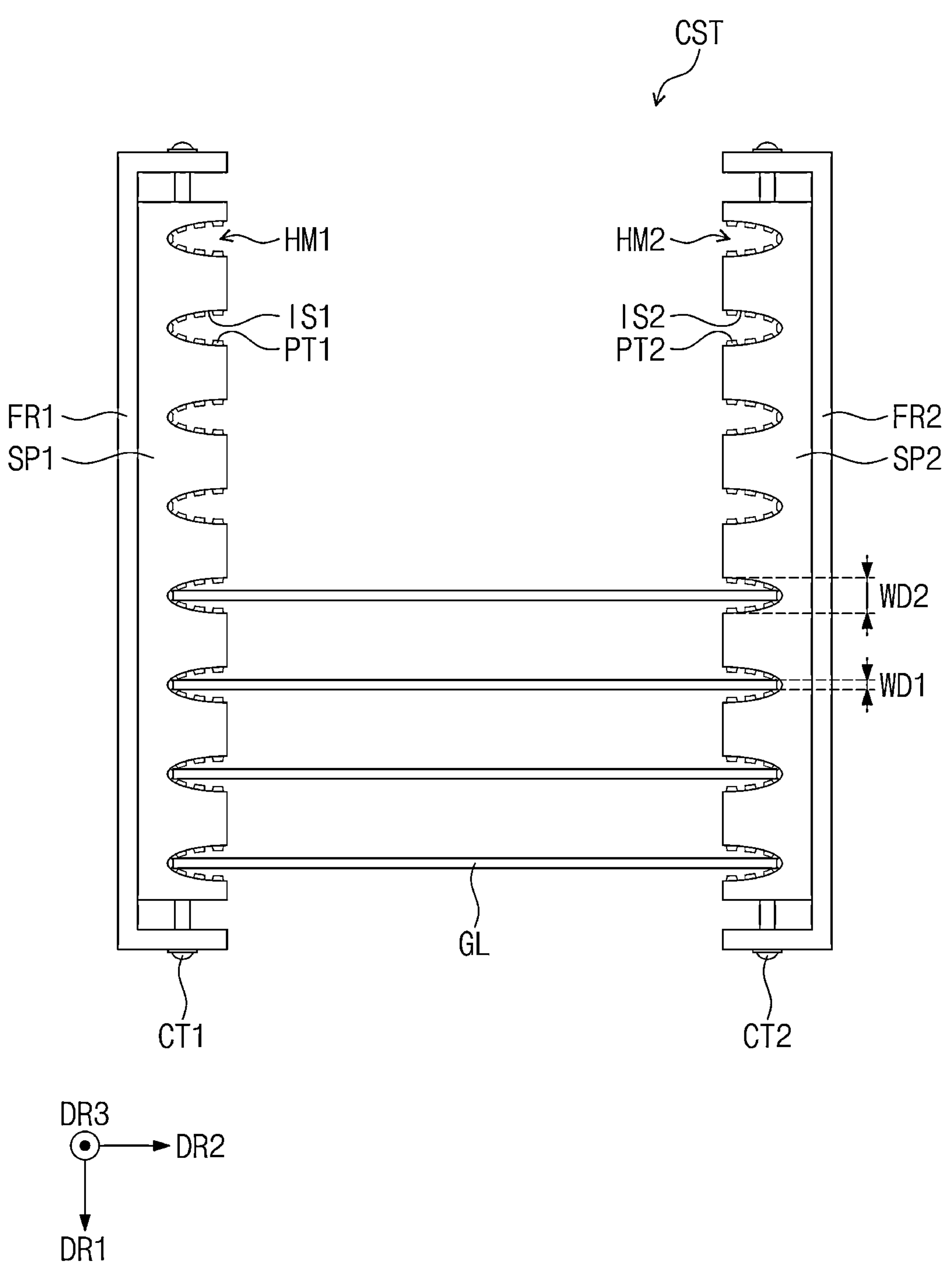
FIG. 5 is a plan view of the glass and the cassette for loading glass according to the embodiment of the present disclosure.

FIG. 5 is a plan view of the glass and the cassette for loading glass according to the embodiment of the present disclosure. In the description of FIG. 5, the components described through FIG. 1 are designated by the same reference numerals, and a description thereof will be omitted. Here, the plan view is a view in the third direction DR3.

Referring to FIG. 5, the first support SP1 may include a first protrusion PT1 protruding from an inner surface IS1 of each of the plurality of first grooves HM1.

The second support SP2 may include a second protrusion PT2 protruding from an inner surface IS2 of each of the plurality of second grooves HM2.

The glass GL may be loaded on the cassette CST for loading glass.

The glass GL may be input to the plurality of first grooves HM1 and the plurality of second grooves HM2 in the input direction ID (see FIG. 4) and loaded.

The first groove HM1 may have a width WD2 in the first direction DR1. The width WD2 of the first groove HM1 may be greater than the width WD1 of the glass GL. Accordingly, the glass GL may be easily input to the first groove HM1.

The glass GL may be spaced apart from the inner surface IS1 of each of the plurality of first grooves HM1 and the inner surface IS2 of each of the second grooves HM2.

The glass GL may be in contact with the first protrusion PT1 and the second protrusion PT2.

After the operation of cleaning the glass GL, the glass GL may be wetted by a cleaning liquid.

Unlike the present disclosure, when the first support SP1 and the second support SP2 do not include the first protrusion PT1 and the second protrusion PT2, respectively, contact areas between the inner surface IS1 of the first support SP1 and the glass GL and between the inner surface IS2 of the second support SP2 and the glass GL may be increased due to a surface tension of the cleaning liquid. Accordingly, a cleaning-adhesion phenomenon may occur between the inner surfaces IS1 and IS2 and the glass GL. Defects such as cracks, scratches, stains, and chipping in which an end portion is broken may occur in the glass GL due to the cleaning-adhesion phenomenon. However, according to the present disclosure, the glass GL is loaded on the first protrusion PT1 and the second protrusion PT2, and thus an area in which the first support SP1 and the second support SP2 and the glass GL are in contact with each other may be minimized. Therefore, the cleaning-adhesion phenomenon may be effectively minimized by the first protrusion PT1 and the second protrusion PT2. Thus, the cassette CST for loading glass having improved reliability may be provided.

Figure 6A:
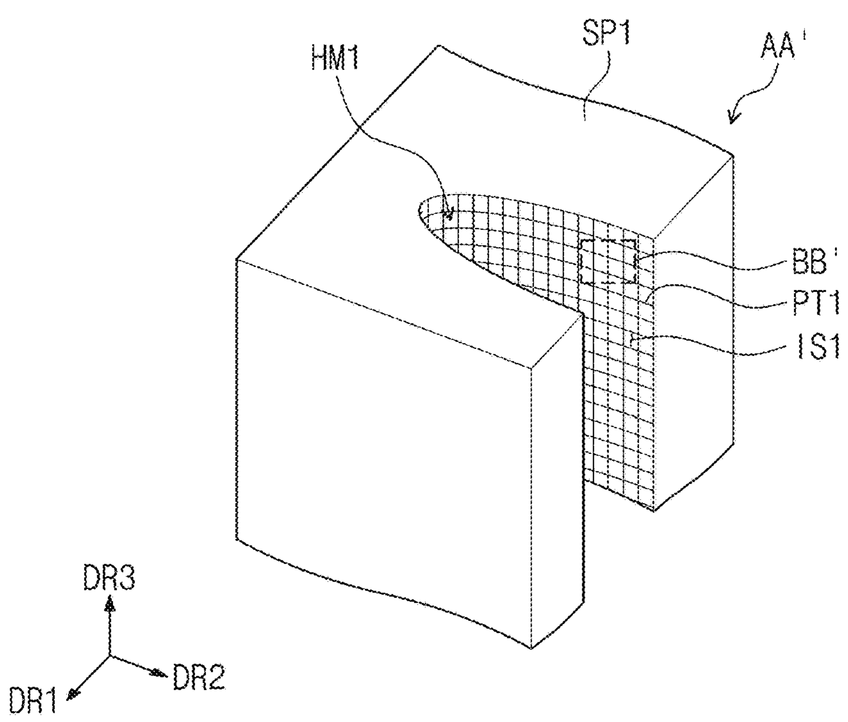
FIG. 6A is an enlarged perspective view illustrating area AA' of FIG. 3 according to the embodiment of the present disclosure.
Figure 6B:
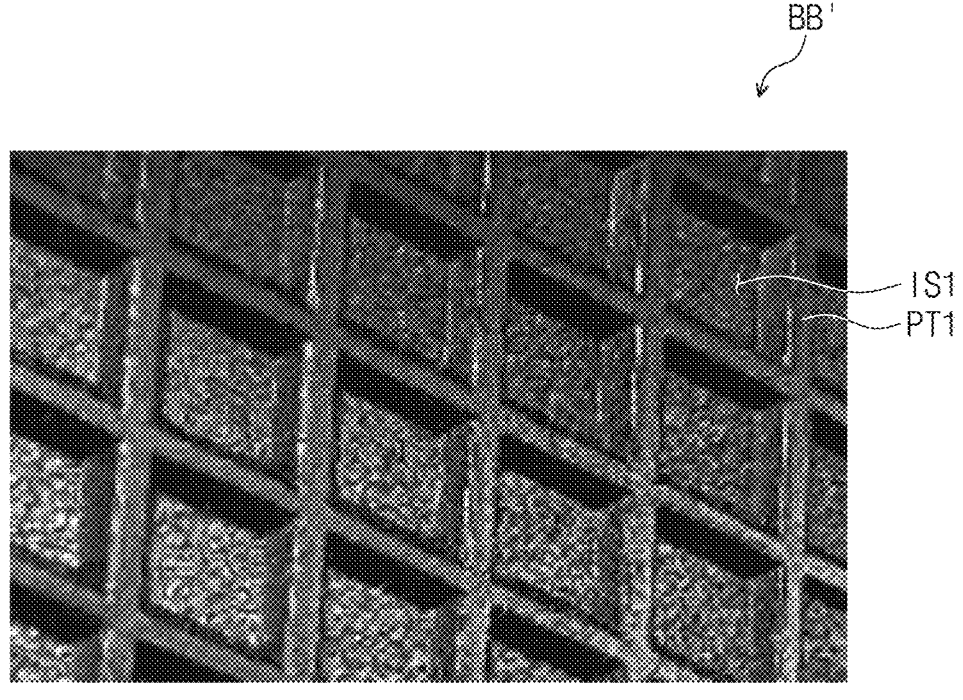
FIG. 6B is an enlarged view illustrating area BB' of FIG. 6A according to the embodiment of the present disclosure.

FIG. 6A is an enlarged perspective view illustrating area AA' of FIG. 3 according to the embodiment of the present disclosure, and FIG. 6B is an enlarged view illustrating area BB' of FIG. 6A according to the embodiment of the present disclosure.

Referring to FIGS. 5 to 6B, the first protrusion PT1 protruding from the inner surface IS1 of the first groove HM1 may have a quadrangular tube shape. The first protrusion PT1 may be provided as a plurality. The plurality of first protrusions PT1 may have a lattice pattern in which the quadrangular tube shape is repeated.

The plurality of first protrusions PT1 may be arranged in the third direction DR3.

Each of the plurality of first protrusions PT1 may include a fluoride resin. For example, each of the plurality of first protrusions PT1 may include Teflon.

The fluoride resin may have friction resistance having a small surface friction coefficient.

In FIGS. 6A and 6B, the first protrusion PT1 is illustrated as an example, but the second protrusion PT2 according to the embodiment of the present disclosure may have the same configuration as the first protrusion PT1.

According to the present disclosure, the glass GL is loaded on the first protrusion PT1 and the second protrusion PT2, and thus an area in which the first support SP1 and the second support SP2 and the glass GL are in contact with each other may be minimized. Occurrence of a sticking phenomenon between the first support SP1 and the second support SP2 and the glass GL may be minimized. Further, each of the first protrusion PT1 and the second protrusion PT2 includes a material having friction resistance, and when the first protrusion PT1 and the second protrusion PT2 come into contact with the glass GL, generation of scratches on the glass GL may be prevented or generation of particles resulting therefrom may be prevented. Thus, the cassette CST for loading glass having improved reliability may be provided.

Figure 7:
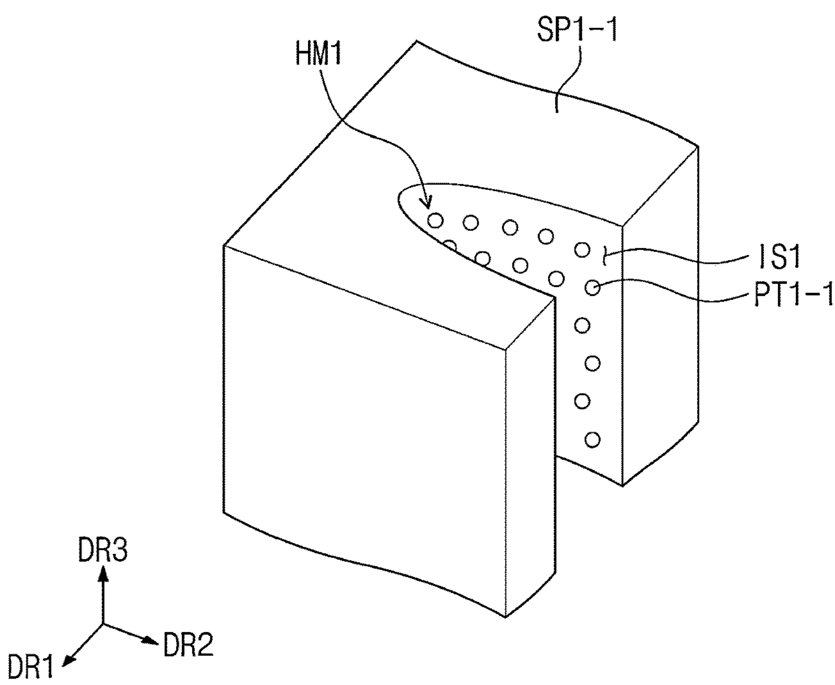
FIG. 7 is a perspective view illustrating an area corresponding to area AA' of FIG. 3 according to the embodiment of the present disclosure.

FIG. 7 is a perspective view illustrating the area corresponding to area AA' of FIG. 3 according to the embodiment of the present disclosure. In the description of FIG. 7, the components described through FIG. 6A are designated by the same reference numerals, and a description thereof will be omitted.

Referring to FIGS. 5 and 7, the first groove HM1 may be defined in a first support SP1-1. The first support SP1-1 may include a first protrusion PT1-1 protruding from the inner surface IS1 of the first groove HM1.

The first protrusion PT1-1 may have a hemispherical shape. The first protrusion PT1-1 may be provided as a plurality.

The plurality of first protrusions PT1-1 may be arranged in the third direction DR3.

Each of the plurality of first protrusions PT1-1 may include a fluoride resin. For example, each of the plurality of first protrusions PT1-1 may include Teflon.

In FIG. 7, the first protrusion PT1-1 is illustrated as an example, but the second protrusion PT2 according to the embodiment of the present disclosure may have the same configuration as the first protrusion PT1-1.

According to the present disclosure, the glass GL is loaded on the first protrusion PT1-1, and thus an area in which the first support SP1-1 and the glass GL are in contact with each other may be minimized. Occurrence of a sticking phenomenon between the first support SP1-1 and the glass GL may be minimized. Further, the first protrusion PT1-1 includes a material having friction resistance, and when the first protrusion PT1 comes into contact with the glass GL, generation of scratches on the glass GL may be prevented or generation of particles resulting therefrom may be prevented. Thus, the cassette CST for loading glass having improved reliability may be provided.

Figure 8:
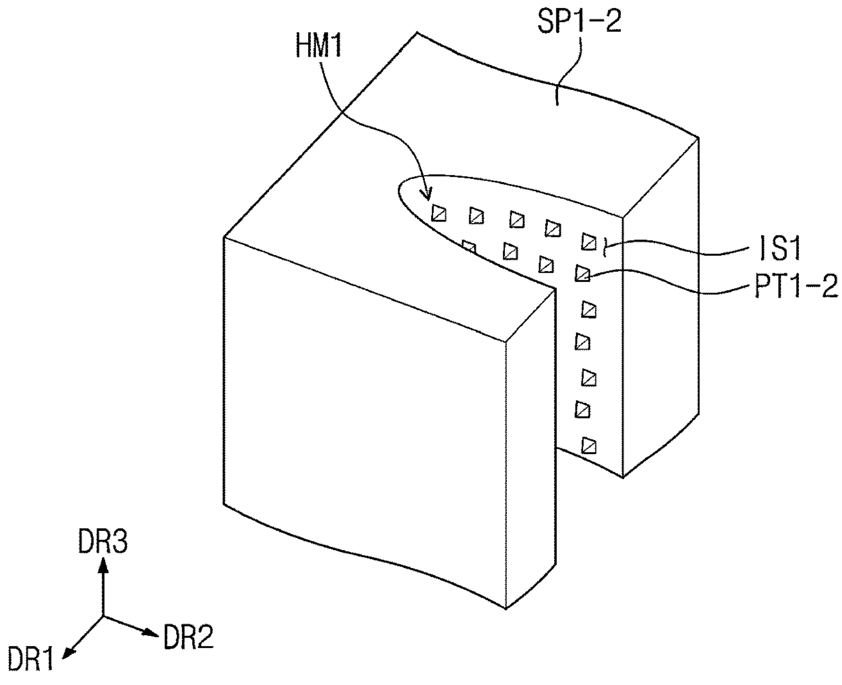
FIG. 8 is a perspective view illustrating the area corresponding to area AA' of FIG. 3 according to the embodiment of the present disclosure.

FIG. 8 is a perspective view illustrating the area corresponding to area AA' of FIG. 3 according to the embodiment of the present disclosure. In the description of FIG. 8, the components described through FIG. 6A are designated by the same reference numerals, and a description thereof will be omitted.

Referring to FIGS. 5 and 8, the first groove HM1 may be defined in a first support SP1-2. The first support SP1-2 may include a first protrusion PT1-2 protruding from the inner surface IS1 of the first groove HM1.

The first protrusion PT1-2 may have a triangular pyramid shape. The first protrusion PT1-2 may be provided as a plurality.

The plurality of first protrusions PT1-2 may be arranged in the third direction DR3.

Each of the plurality of first protrusions PT1-2 may include a fluoride resin. For example, each of the plurality of first protrusions PT1-2 may include Teflon.

In FIG. 8, the first protrusion PT1-2 is illustrated as an example, but the second protrusion PT2 according to the embodiment of the present disclosure may have the same configuration as the first protrusion PT1-2.

According to the present disclosure, the glass GL is loaded on the first protrusion PT1-2, and thus an area in which the first support SP1-2 and the glass GL are in contact with each other may be minimized. Therefore, occurrence of a sticking phenomenon between the first support SP1-2 and the glass GL may be effectively minimized. Further, the first protrusion PT1-2 includes a material having friction resistance, and when the first protrusion PT1-2 comes into contact with the glass GL, generation of scratches on the glass GL may be prevented or generation of particles resulting therefrom may be effectively prevented. Thus, the cassette CST for loading glass having improved reliability may be provided.

As described above, when one end of glass is input through a first groove, the first groove may guide the glass until the other end of the glass is input. That is, the glass may be easily input along the integrally-formed first groove in an input direction. Thus, a cassette for loading glass having improved reliability of the glass may be provided.

Further, according to the present disclosure, the glass is loaded on a first protrusion and a second protrusion, and thus an area in which a first support and a second support and the glass are in contact with each other may be minimized. Adhesion of the glass due to a surface tension of a cleaning liquid on a surface of the glass may be minimized by the first protrusion and the second protrusion. Thus, the cassette for loading glass having improved reliability may be provided.

Although the description has been made above with reference to an embodiment of the present disclosure, it may be understood that those skilled in the art or those having ordinary knowledge in the art may variously modify and changes the present disclosure without departing from the spirit and technical scope of the present disclosure described in the appended claims. Accordingly, the technical scope of the present disclosure is not limited to the detailed description of the specification, but should be defined by the appended claims.

What is claimed is:

1. A cassette for loading glass, the cassette comprising:
a first frame extending in a first direction;
a second frame spaced apart from the first frame in a second direction intersecting the first direction;
a first support coupled to the first frame; and
a second support coupled to the second frame,
wherein a plurality of first grooves are defined in the first support,
the plurality of first grooves are spaced apart from each other in the first direction,
each of the plurality of first grooves extends in a third direction intersecting the first direction and the second direction, and
the first support includes a plurality of first protrusions protruding from an inner surface of each of the plurality of first grooves in directions that intersect a portion of the inner surface from which the first protrusions protrude,
in a cross-section orthogonal to the third direction, each of the first grooves is a continuously curved surface that includes a first surface and a second surface that face each other,
the first protrusions are positioned on each of the first and second surfaces, and
at least some of the first protrusions on the first surface extend in different directions, and at least some of the first protrusions on the second surface extend in different directions.

2. The cassette of claim 1, wherein each of the first protrusions includes a fluoride resin.

3. The cassette of claim 1, wherein the first protrusions are arranged to be adjacent to each other.

4. The cassette of claim 1, wherein each of the first protrusions has a quadrangular tube shape.

5. The cassette of claim 1, wherein each of the first protrusions has a hemispherical shape.

6. The cassette of claim 1, wherein each of the first protrusions has a triangular pyramid shape.

7. The cassette of claim 1, wherein the plurality of first protrusions are arranged in the third direction.

8. The cassette of claim 1, wherein a plurality of second grooves facing the plurality of first grooves in the second direction are defined in the second support.

9. The cassette of claim 8, wherein each of the plurality of second grooves extends in the third direction intersecting the first direction and the second direction.

10. The cassette of claim 8, wherein the second support includes a second protrusion protruding from an inner surface of each of the plurality of second grooves.

11. The cassette of claim 10, wherein the second protrusion has a quadrangular tube shape.

12. The cassette of claim 1, wherein the first frame comprises a first planar portion that defines a first plane including the first and third directions, and the second frame comprises a second planar portion that defines a second plane parallel to the first plane.

13. The cassette of claim 12, wherein the first support is coupled directly to a surface of the first frame facing the second frame, and the second support is coupled directly to a surface of the second frame facing the first frame.

14. The cassette of claim 1, wherein each of the plurality of first grooves extends continuously from opposite edges of the first support along the third direction.

15. The cassette of claim 1, wherein each of the plurality of first grooves define a space therein, and for each of the plurality of first grooves, the first protrusions are contained entirely within the space.

16. The cassette of claim 1, wherein at least some of the first protrusions protrude in a direction intersecting the second direction.

17. The cassette of claim 1, wherein the first direction is perpendicular to the second and third directions, and the second direction is perpendicular to the third direction.

18. The cassette of claim 1, wherein at least one of the first protrusions protrudes from an apex of the inner surface.

* * * * *